(12) United States Patent  
Krishnan et al.

(10) Patent No.: US 8,583,622 B2
(45) Date of Patent: Nov. 12, 2013

(54) APPLICATION OF BREADCRUMBS IN RANKING AND SEARCH EXPERIENCES

(75) Inventors: Vijay Krishnan, Hyderabad (IN); Puneet Agrawal, Hyderabad (IN); Ankur Khator, Hyderabad (IN); Sree Hari Nagaralu, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/411,804

(22) Filed: Mar. 5, 2012

(65) Prior Publication Data

US 2013/0232128 A1    Sep. 5, 2013

(51) Int. Cl.
*G06F 17/30* (2006.01)

(52) U.S. Cl.
USPC .......................... 707/711; 707/706

(58) Field of Classification Search
None
See application file for complete search history.

(56) References Cited

U.S. PATENT DOCUMENTS

| 7,707,506 B2 | 4/2010 | Weigel et al. |
| 2008/0052275 A1 | 2/2008 | Kantak et al. |
| 2009/0058820 A1 | 3/2009 | Hinckley |
| 2009/0089678 A1 | 4/2009 | Sacco et al. |
| 2009/0187537 A1 | 7/2009 | Yachin et al. |
| 2011/0106834 A1 | 5/2011 | Blackwell et al. |
| 2011/0225190 A1 | 9/2011 | Kelly et al. |
| 2011/0276562 A1* | 11/2011 | Madden-Woods et al. ... 707/722 |
| 2013/0019210 A1* | 1/2013 | Priestly et al. ............... 715/854 |

OTHER PUBLICATIONS

Helic, et al., "The Effects of Navigation Tools on the Navigability of Web-Based Information Systems", In Proceedings of the 11th International Conference on Knowledge Management and Knowledge Technologies, Sep. 7, 2011, 8 pages.

* cited by examiner

*Primary Examiner* — Pierre Vital
*Assistant Examiner* — David T Brooks
(74) *Attorney, Agent, or Firm* — Shook Hardy & Bacon LLP

(57) ABSTRACT

Methods, computer systems, and computer-readable storage media for utilizing breadcrumb information associated with a Web page to improve a user's search experience on a search engine page and to improve ranking of search results are provided. Breadcrumb information is identified for a plurality of Web pages and is used to create an entity data structure. The entity data structure is used to determine related search items, deep links, and query suggestions on a search engine page. Further, contextual relationships between different breadcrumb elements that are part of a breadcrumb trail associated with a Web page are identified and used to adjust a ranking order of the Web page on a search engine results page.

18 Claims, 10 Drawing Sheets

APPLICATION OF BREADCRUMBS IN RANKING AND SEARCH EXPERIENCES

BACKGROUND

Traditionally, search engines have employed a number of ranking features to improve search experiences for users and to improve ranking of Web pages. These ranking features may include search engine user signals such as user clicks on search results or advertisements, impressions delivered, query logs, and user session history (uniform resource locator streams). These search engine user signals are used to improve search experiences for users, but the ranking features are often skewed in favor of high frequency queries (so-called "head queries") and fail to take into account those queries that occur at a lower frequency.

Ranking features may also include Web content consumption signals which give an indication of how users behave on a particular Web page other than a search engine page. Some examples of consumption signals include user responses to questions on a forum, user "likes," "rates," "shares," and tweets. Additionally, ranking features may include publisher signals. These signals are supplied by the owner of a Web page or domain and typically provide information about the Web page or domain. The information may concern the layout of the Web page, textual information as embodied in the content of a Web page, and the overall structure of the domain. This information, especially the textual information on a Web page, may be used to rank the Web page on a search engine results page. For example, once a user enters a query, the search engine searches for Web pages having textual elements that match terms in the query. Web pages having a greater number of matches are ranked higher than Web pages having a lower number of matches.

One type of publisher signal of note is breadcrumbs. Breadcrumbs serve several functions. For instance, breadcrumbs help domain owners to arrange Web pages in a logical fashion. They also help to provide a user an overall context of any given Web page with respect to the entire domain. As a navigational tool, breadcrumbs provide a description of the trail that a user has taken to arrive at a Web page within a domain. The trail is typically published near the top of the Web page underneath the title bar. One example of a breadcrumb trail is "U.S.>Missouri>Kansas City." Thus, the user entered the domain at the "U.S." page, then navigated to the "Missouri" page, and then navigated to the "Kansas City" page. The different breadcrumb elements are selectable and enable the user to navigate to other interesting pages. Breadcrumbs provide a wealth of information about a domain and relationships between different Web pages within the domain. This information can be used to improve searching experiences for users and to improve ranking of Web pages.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Aspects of the present invention relate to systems, methods, and computer-readable storage media for, among other things, generating an entity data structure using breadcrumb information and using the entity data structure to improve a user's search experience on a search engine page. Additionally, the present invention is also directed to using breadcrumb information to improve ranking of Web pages on a search engine results page. In brief and at a high level, breadcrumb information for Web pages within a single domain is extracted and used to construct an entity data structure that comprises structural relationships between different breadcrumb elements. Incident to a user inputting a search query, the entity data structure is utilized to provide related search items, suggested queries, and deep links on a search engine page. As well, incident to a user inputting a search query, terms in the search query are matched to a breadcrumb element associated with a Web page. Contextual relationships between the breadcrumb element and other breadcrumb elements that are part of the Web page's breadcrumb trail and contextual relationships between the breadcrumb element and different page elements of the Web page (title, heading, and/or body) are determined, and the relationships are used as a ranking feature.

Accordingly, the present invention is directed to a system for generating an entity data structure using breadcrumb information. The system comprises a computing device associated with a search engine having one or more processors and one or more computer-readable storage media, and a data stored coupled with the search engine. The search engine identifies a plurality of Web pages associated with a single domain, and identifies hypertext markup language (HTML) source code for each Web page of the plurality of Web pages. Using the HTML source code for the each Web page, the search engine determines breadcrumb information associated with the each Web page. The breadcrumb information comprises relationships between breadcrumb elements of a breadcrumb trail associated with the each Web page. The breadcrumb information for the plurality of Web pages belonging to the single domain is aggregated, and the aggregated breadcrumb information is used to generate an entity data structure. The entity data structure comprises structural relationships between different breadcrumb elements.

In another aspect, the present invention is directed to one or more computer-readable storage media having embodied thereon computer-executable instructions that, when executed, perform a method of improving a user's search experience on a search engine page using an entity data structure generated using breadcrumb elements from a plurality of Web pages. At least a portion of a first search query inputted by a user is received. The entity data structure is accessed, the entity data structure is in the form of a graph data structure having one or more root nodes, one or more parent modes, and one or more child nodes. Using the entity data structure, the at least a portion of the search query is substantially matched to a breadcrumb element associated with a first child node in the entity data structure; the first child node has a first parent node. At least a second child node at the same structural level as the first child node is determined; the second child node shares the same root node as the first child node. A second parent node associated with the at least the second child node is identified; the second parent node is different from the first parent node. Breadcrumb elements associated with the second parent node and the at least the second child node are presented as at least one related search item on the search engine results page.

In yet another aspect, the present invention is directed to a computerized method carried out by a search engine running on one or more processors for ranking a Web page on a search engine results page using breadcrumb information associated with the Web page. The method comprises receiving at least a portion of a search query inputted by a user. A data store is accessed; the data store comprises a plurality of breadcrumb elements associated with a plurality of Web pages. The at least a portion of the search query is substantially matched to a first breadcrumb element. It is determined that the first breadcrumb element is part of a breadcrumb trail associated with the Web page of the plurality of Web pages; the breadcrumb trail comprises a plurality of breadcrumb elements in a structural arrangement. At least a second breadcrumb is determined that is part of the breadcrumb trail. A contextual relationship between the first breadcrumb element and the at least the second breadcrumb element is determined. The contextual relationship is used to dynamically determine a ranking order of the Web page on the search engine results page.

BRIEF DESCRIPTION OF THE DRAWINGS

The present invention is described in detail below with reference to the attached drawings figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Aspects of the present invention relate to systems, methods, and computer-readable storage media for, among other things, generating an entity data structure using breadcrumb information and using the entity data structure to improve a user's search experience on a search engine page. Additionally, the present invention is also directed to using breadcrumb information to improve ranking of Web pages on a search engine results page. In brief and at a high level, breadcrumb information for Web pages within a single domain is extracted and used to construct an entity data structure that comprises structural relationships between different breadcrumb elements. Incident to a user inputting a search query, the entity data structure is utilized to provide related search items, suggested queries, and deep links on a search engine page. As well, incident to a user inputting a search query, terms in the search query are matched to a breadcrumb element associated with a Web page. Contextual relationships between the breadcrumb element and other breadcrumb elements that are part of the Web page's breadcrumb trail and contextual relationships between the breadcrumb element and different page elements of the Web page (title, heading, and/or body) are determined, and the relationships are used as a ranking feature.

Figure 1:
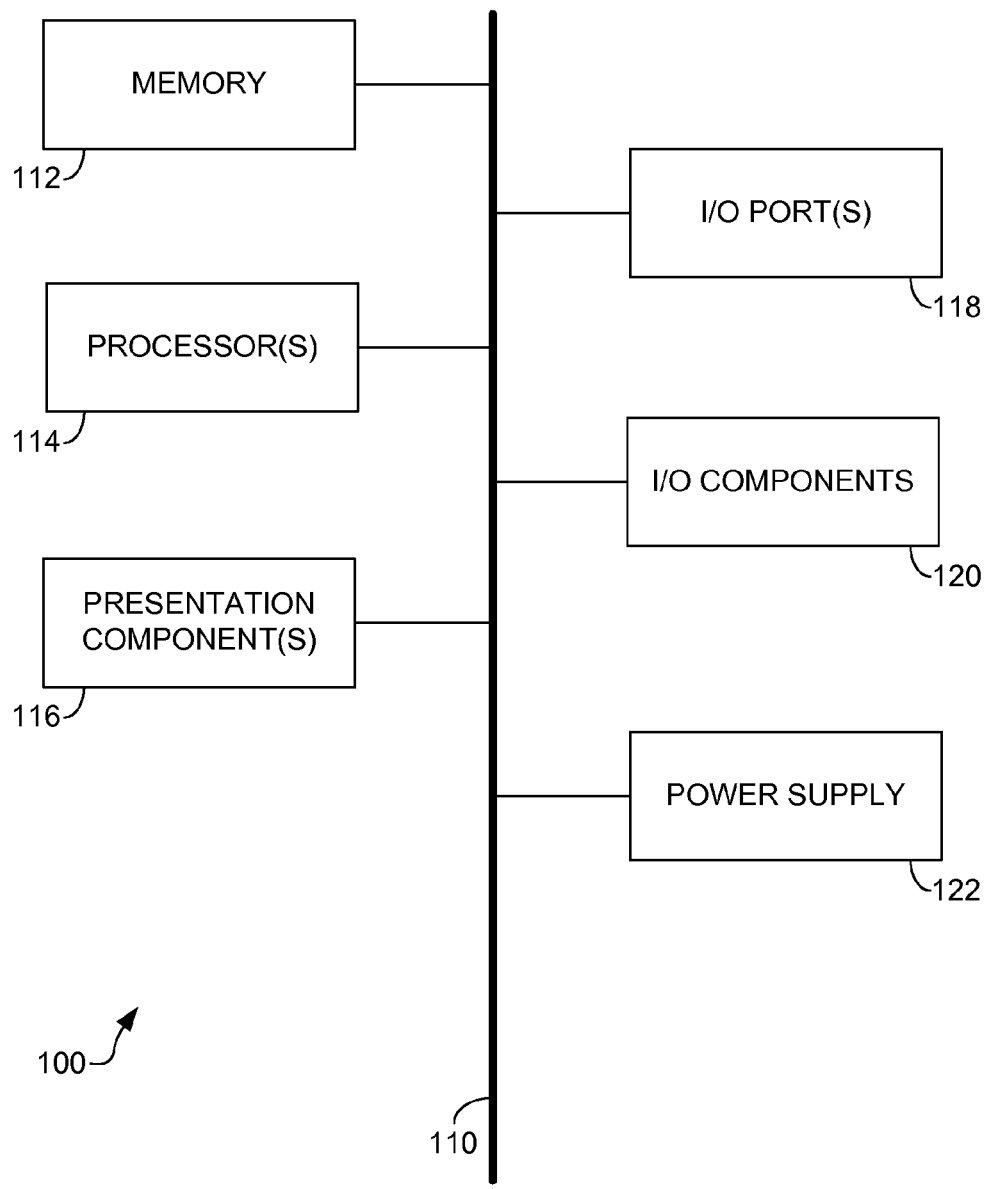
FIG. 1 is a block diagram of an exemplary computing environment suitable for use in implementing embodiments of the present invention.

An exemplary computing environment suitable for use in implementing embodiments of the present invention is described below in order to provide a general context for various aspects of the present invention. Referring to FIG. 1, such an exemplary computing environment is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that performs particular tasks or implements particular abstract data types. Embodiments of the invention may be practiced in a variety of system configurations, including hand-held devices, consumer electronics, general-purpose computers, more specialty computing devices, and the like. Embodiments of the invention may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computer" or "computing device."

The computing device 100 typically includes a variety of computer-readable media. Computer-readable media may be any available media that is accessible by the computing device 100 and includes both volatile and nonvolatile media, removable and non-removable media. Computer-readable media comprises computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media, on the other hand, embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, etc.

Aspects of the subject matter described herein may be described in the general context of computer-executable instructions, such as program modules, being executed by a mobile device. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Furthermore, although the term "server" is often used herein, it will be recognized that this term may also encompass a search engine, a Web browser, a set of one or more processes distributed on one or more computers, one or more stand-alone storage devices, a set of one or more other computing or storage devices, a combination of one or more of the above, and the like.

Figure 2:
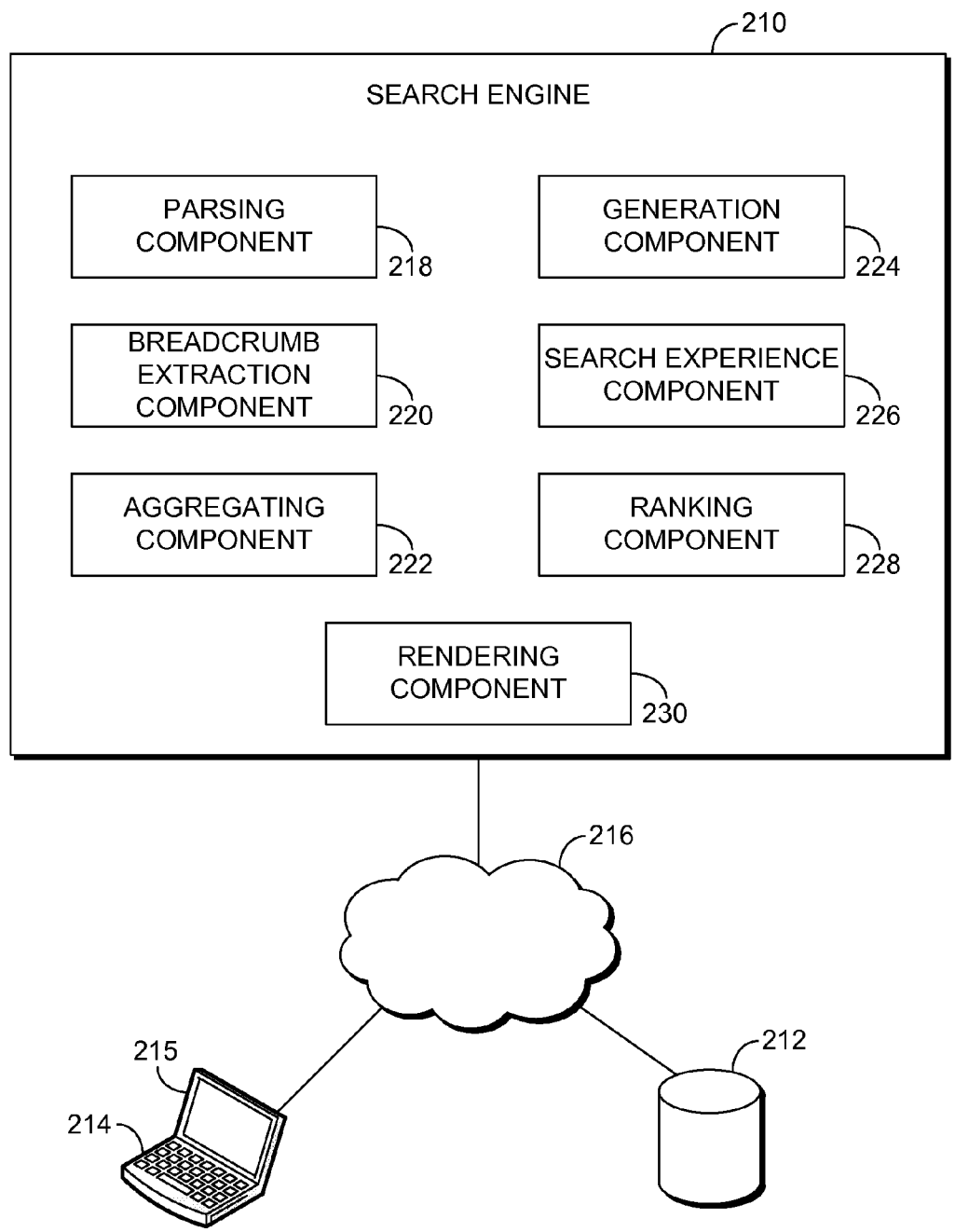
FIG. 2 is a block diagram of an exemplary system for use in generating an entity data structure using breadcrumb information and using breadcrumb information to enhance a user's search experience and to improve ranking of Web pages suitable for use in implementing embodiments of the present invention.

With this as a background and turning to FIG. 2, an exemplary system 200 is depicted for use in generating an entity data structure using breadcrumb information, using the entity data structure to improve a user's search experience, and using breadcrumb information to improve Web page ranking. The system 200 is merely an example of one suitable system environment and is not intended to suggest any limitation as to the scope of use or functionality of embodiments of the present invention. Neither should the system 200 be interpreted as having any dependency or requirement related to any single module/component or combination of modules/components illustrated therein.

The system 200 includes a search engine 210, a data store 212, and an end-user computing device 214 all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

In some embodiments, one or more of the illustrated components/modules may be implemented as stand-alone applications. In other embodiments, one or more of the illustrated components/modules may be integrated directly into, for example, the operating system of the end-user computing device 214 or the search engine 210. The components/modules illustrated in FIG. 2 are exemplary in nature and in number and should not be construed as limiting. Any number of components/modules may be employed to achieve the desired functionality within the scope of embodiments hereof. Further, components/modules may be located on any number of servers. By way of example only, the search engine 210 might reside on a server, a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components/modules, and in any suitable combination and location. Various functions described herein as being performed by one or more entities may be carried out by hardware, firmware, and/or software. For instance, various functions may be carried out by a processor executing instructions stored in memory.

The data store 212 is configured to store information for use by, for example, the search engine 210. The information stored in association with the data store 212 is configured to be searchable for one or more items of information stored in association therewith. The information stored in association with the data store 212 may comprise general information used by the search engine 210. For example, the data store 212 may store information concerning recorded search behavior (query logs, browser or search logs, query click logs, impression logs, etc.) of users in general, and a log of a particular user's tracked interactions with the search engine 210. The data store 212 is also configured to store search results corresponding to one or more inputted search queries; the search results may be in the form of Web pages.

The data store 212 may also store information concerning Web content consumption. This information reflects users' interactions with Web site content outside of search engine pages. Such information may include "like" information, "share" information, user rating information, tweet content and frequency information, social network information, interactions with user forums, and the like.

Additionally, the data store 212 stores publisher-provided information about Web pages and domains. As used throughout this Specification, the term "publisher" means the owner of a Web page or a domain. In turn, the owner may comprise an individual, a business entity, and the like. Publisher-provided information may include the number and identity of Web pages belonging to a single domain, structural and layout-based information for individual Web pages and the domain as a whole, information concerning content associated with a Web page, and breadcrumb information associated with a Web page and/or domain. The breadcrumb information includes individual breadcrumb elements and their relationships to other breadcrumb elements that make up a breadcrumb trail of a Web page.

Figure 3:
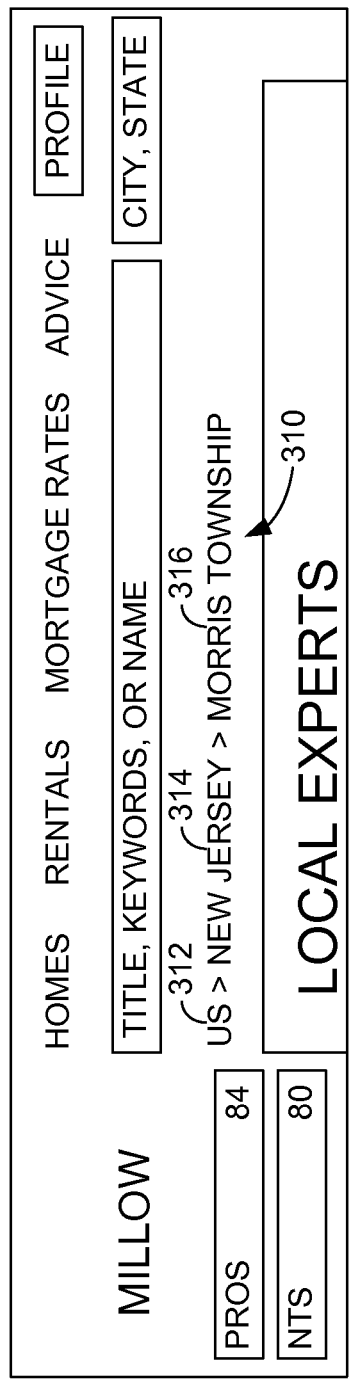
FIG. 3 is an exemplary user interface illustrating a breadcrumb trail in accordance with an embodiment of the present invention.

FIG. 3 depicts an exemplary user interface 300 illustrating an exemplary breadcrumb trail 310 on a Web page that is part of the "Millow" domain. The breadcrumb trail 310 includes a first breadcrumb element 312, "US," a second breadcrumb element 314, "New Jersey," and a third breadcrumb element 316, "Morris Township." The breadcrumb elements 312, 314, and 316 are in a defined order that indicates the path the user took to arrive at the current Web page. For instance, the Morris Township Web page was reached after the user traversed the Web page "US," and the Web page "New Jersey."

The breadcrumb trail 310 not only provides information about the navigational path utilized to reach the current page, but it also provides information about the structural relationship between different breadcrumb elements; the breadcrumb elements may also be thought of as entities. As used throughout this Specification, the term entity is meant to encompass people, locations, objects, concepts, topics, and the like. Thus, the breadcrumb trail 310 indicates that the entity Morris Township 316 is related to the entity New Jersey 314, which is related to yet another entity US 312.

The data store 212 is also configured to store a number of data structures generated and used by, for example, the search engine 210. The data structures may include an entity data structure generated using breadcrumb information. The entity data structure may be specific to a single domain. Alternatively, the entity data structure may encompass entity relationships across a plurality of domains. These different data structures will be explored in greater depth below.

The content and volume of such information in the data store 212 are not intended to limit the scope of embodiments of the present invention in any way. Further, though illustrated as a single, independent component, the data store 212 may, in fact, be a plurality of storage devices, for instance, a database cluster, portions of which may reside on the search engine 210, the end-user computing device 214, and/or any combination thereof.

The end-user computing device 214 shown in FIG. 2 may be any type of computing device, such as, for example, the computing device 100 described above with reference to FIG. 1. By way of example only and not limitation, the end-user computing device 214 may be a personal computer, desktop computer, laptop computer, handheld device, mobile handset, consumer electronic device, or the like. It should be noted, however, that embodiments are not limited to implementation on such computing devices, but may be implemented on any of a variety of different types of computing devices within the scope of embodiments hereof. As shown, the end-user computing device 214 includes a display screen 215. The display screen 215 is configured to present information, including Web pages and search engine pages to the user of the end-user computing device 214.

The system 200 is merely exemplary. While the search engine 210 is illustrated as a single unit, it will be appreciated that the search engine 210 is scalable. For example, the search engine 210 may in actuality include a plurality of computing devices in communication with one another. Moreover, the data store 212, or portions thereof, may be included within, for instance, the search engine 210 as a computer-storage medium. The single unit depictions are meant for clarity, not to limit the scope of embodiments in any form.

As shown in FIG. 2, the search engine 210 comprises a parsing component 218, a breadcrumb extraction component 220, an aggregating component 224, a generation component 224, a search experience component 226, a ranking component 228, and a rendering component 230. In some embodiments, one or more of the components 218, 220, 222, 224, 226, 228, and 230 may be implemented as stand-alone applications. In other embodiments, one or more of the components 218, 220, 222, 224, 226, 228, and 230 may be integrated directly into the operating system of a computing device such as the computing device 100 of FIG. 1. It will be understood that the components 218, 220, 222, 224, 226, 228, and 230 illustrated in FIG. 2 are exemplary in nature and in number and should not be construed as limiting. Any number of components may be employed to achieve the desired functionality within the scope of embodiments hereof.

The parsing component 218 is configured to extract Web pages belonging to a single domain (from, for example, the data store 212) and to identify hypertext markup language (HTML) source code for each of the extracted Web pages. The HTML-parsed Web page provides information concerning HTML tag patterns, content associated with the tag patterns, the overall structure of the Web page as well as textual elements associated with the Web page.

The breadcrumb extraction component 220 is configured to utilize the HTML-parsed Web page to determine breadcrumb information associated with the Web page. The breadcrumb information includes structural relationships between different breadcrumb elements of a breadcrumb trail that is associated with the Web page. The breadcrumb extraction component 220 applies a set of heuristic-based rules to identify breadcrumb information. For instance, the breadcrumb extraction component 220 analyzes the various HTML tags and associated content within the tags. Heuristic rules are applied to this information to identify and extract the breadcrumb information. The breadcrumb extraction component 220 is also configured to indentify hierarchy separators that are commonly associated with breadcrumb trails. Such separators may include the symbols, >, >>, and/or :. Additionally, the breadcrumb extraction component 220 is configured to determine a position on the Web page of the identified HTML tags, content, and the hierarchy separators. For example, most breadcrumb trails appear at the top of the Web page underneath the title bar. Applying the heuristic rules to the identified information, the breadcrumb extraction component 220 identifies and extracts breadcrumb information associated with the Web page.

The aggregating component 222 is configured to aggregate the breadcrumb information for all the Web pages belonging to the single domain. In one aspect, the aggregating component 222 is configured to aggregate breadcrumb information across multiple domains.

The generation component 224 is configured to generate one or more entity data structures using the aggregated breadcrumb information. The entity data structures are generated offline and describe structural relationships between different breadcrumb elements. Each of the breadcrumb elements may be thought of as an entity, and, thus, the entity data structure describes structural relationships between different entities. The structural relationships between different breadcrumb elements may be used to enhance a user's search experience on a search engine page and to improve ranking of Web pages as outlined more fully below. Additionally, the entity data structures may be useful in certain classification schemes. For instance, entities associated with Web pages are typically identified based on textual elements within the body of the Web page. However, an entity data structure may be utilized instead to determine entities associated with Web pages. By way of illustrative example, an entity data structure may indicate the relationship Auto→Honda→Honda CRX, where Honda CRX is part of a breadcrumb trail associated with a Web page "A." Instead of determining that the entity "Honda CRX" is associated with Web page "A" based on textual elements within the body of Web page "A," the entity "Honda CRX" may be extracted from the entity data structure.

In one aspect, entity data structures are generated using breadcrumb information associated with a single domain. While in another aspect, entity data structures are generated using breadcrumb information across multiple domains. Further, individual entity data structures corresponding to single domains may be aggregated by the generation component 224 to create a master entity data structure.

In yet another aspect, the generation component 224 generates an entity data structure(s) using breadcrumb information associated with a single domain but supplements the entity data structure with information from entity data structures of different domains. For instance, suppose an entity data structure is generated for the domain "Autosgalore." Additionally, an entity data structure is generated for the domain "Autotrade." The Autosgalore entity data structure lacks information on a new car that was recently released, but the Autotrade entity data structure has information concerning the new car. The generation component 224 extracts the new car information from the Autotrade data structure and supplements the Autosgalore entity data structure with the new car information. The new car information is inserted at the appropriate structural level of the Autosgalore entity data structure based on a reconciliation process undertaken by the generation component 224. For instance, the generation component 224 determines the structural position of the new car information in the Autotrade entity data structure, determines contextual relationships between the new car information and other information in the Autotrade data structure, and inserts the new car information into the Autosgalore data structure based on this information.

In one aspect, the entity data structure is structured like a graph data structure having multiple nodes connected to each other. In yet another aspect, the graph data structure may be structured like a tree data structure. For convenience sake, the terms "root node," "parent node," and "child node" will be utilized to describe the different structural relationships between the nodes. However, other ways of describing the structural relationships between the different nodes are contemplated and within the scope of the invention. That being said, the data structure may comprise a root node, one or more parent nodes, and one or more child nodes. In turn, each child node has one parent node, and the children of each node have a specific order. Further, each node of the data structure is associated with a breadcrumb element.

Figure 4:
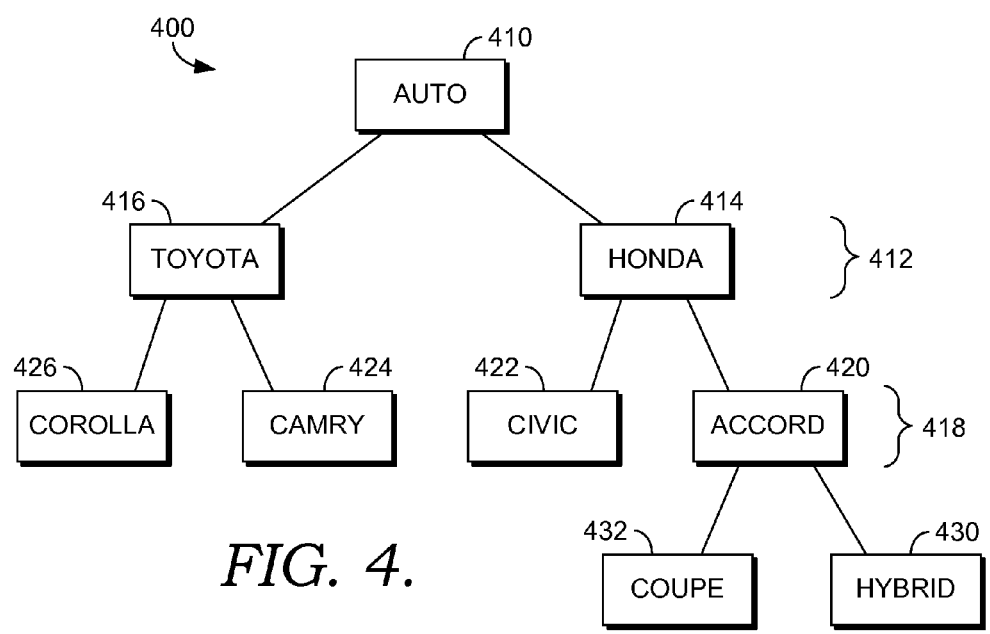
FIG. 4 is an exemplary entity data structure generated using breadcrumb information in accordance with an embodiment of the present invention.

FIG. 4 depicts an exemplary entity data structure 400 that illustrate the structural relationship between different nodes. The excerpted data structure 400 is illustrative and exemplary in nature and is not meant to be limiting in any way. The purpose of FIG. 4 is to portray concepts and relationships between various data elements and not the actual arrangement of data in a data store.

The data structure 400 comprises a root node 410, "Auto." The root node 410 represents the broadest category of entities or concepts. The root node 410 has two child nodes 412 which comprise a Honda® node 414 and a Toyota® node 416. As can be seen, the child nodes 412 describe a slightly narrower category of entities as compared to the root node 410. Continuing, the Honda node 414 and the Toyota node 416 are parent nodes of additional child nodes 418. More specifically, the Honda node 414 is the parent node of Accord® node 420 and Civic® node 422, while the Toyota node 416 is the parent node of Camry® node 424 and Corolla® node 426. These nodes represent a still narrower category of entities as compared to the root node 410 and the parent nodes 414 and 416. Although the Accord node 420 and the Civic node 422 have a different parent node than the Camry node 424 and the Corolla node 426, the nodes 420, 422, 424, and 426 are at the same structural level and share the same root node 410. In general, nodes are at the same structural level if they share the same root node and have the same number of intervening nodes between themselves and the root node. The data structure 400 may continue on for any number of levels with increasing levels of specificity as the data structure 400 is traversed. For example, nodes 430 and 432 (Hybrid and Coupe) provide an additional layer of specificity to the Accord node 420.

Turning back to FIG. 2, the search engine 210 further comprises a search experience component 226. The search experience component 226 is configured to utilize the entity data structure to provide a number of different search experiences for a user on a search engine page. The search experience component 226 operates dynamically. As used throughout this Specification, the term dynamically means occurring in near real-time. These search experiences will be described in some detail here; additional detail will be provided below with respect to FIGS. 5-10.

In one aspect, the search experience component 226 is configured to generate related search items in response to a user-inputted search query. The search experience component 226 utilizes the entity data structure generated by the generation component 224 to substantially match a portion of a search query received from a user to a breadcrumb element associated with a first child node of the data structure. The matching may comprise matching a term in the search query to similar text in the breadcrumb element. The search experience component 226 is further configured to determine a second child node that is at the same structural level as the first child node and to determine a parent node associated with the second child node. In one aspect, the second parent node is different from the parent node associated with the first child node. Breadcrumb elements associated with the second child node and its associated parent node are combined to create a related search item.

In another aspect, the search experience component 226 is configured to utilize the entity data structure to generate suggested queries in response to a user-inputted search query. For instance, a search query comprising a complete term is received by, for example, the search engine 210, and the search experience component 226 substantially matches the user-inputted search query to a breadcrumb element associated with a parent node of the entity data structure. The component 226 next determines one or more child nodes that are associated with the parent node. Breadcrumb elements associated with the parent node and the child nodes are combined to create one or more suggested search queries.

Also with respect to suggested queries, instead of performing a normal search, the user may be performing a vertical search using a vertical search engine. In this aspect, the user may just enter one or more letters of a complete term. Based on the one or more letters, the search experience component 226 matches the one or more letters to a breadcrumb element in an entity data structure having subject matter that is the same as the vertical search. Using the process outlined above, one or more search suggestions are generated corresponding to the one or more inputted letters and the subject matter of the vertical search.

In yet another aspect, the search experience component 226 is configured to utilize the entity data structure to generate one or more deep links associated with a search result. With respect to this aspect, the search experience component 226 accesses the data store 212 to determine a search result (e.g., a Web page) corresponding to a user-inputted search query. As well, the search experience component 226 substantially matches the user-inputted search query to a breadcrumb element associated with a parent node of an entity data structure; the entity data structure is associated with the domain to which the search result belongs. The component 226 next determines one or more child nodes associated with the parent node. The breadcrumb information from the parent node and the one or more child nodes is combined to create a deep link; the deep link is presented (by, for example, the rendering component 230) in conjunction with the search result corresponding to the search query. Selection of the deep link navigates the user to a second Web page having more refined content than content associated with the search result.

The search engine 210 further comprises the ranking component 228; the ranking component 228 is configured to rank a Web page on a search engine results page using breadcrumb information associated with the Web page. The ranking component 228 substantially matches a user-inputted search query to a breadcrumb element stored in association with the data store 212. The ranking component 228 is further configured to determine that the breadcrumb element is part of a breadcrumb trail associated with the Web page. Other breadcrumb elements that are part of the breadcrumb trail are determined, and contextual relationships between the first breadcrumb element and the other breadcrumb elements are determined. The contextual relationships may include information concerning the relative position of the first breadcrumb element as compared to the other breadcrumb elements in the breadcrumb trail, the identity of all breadcrumb elements present in the breadcrumb trail, the textual meaning of the breadcrumb elements, and the like.

The ranking component 228 is also configured to determine contextual relationships between the first breadcrumb element and other page elements associated with the Web page; page elements may include, for example, the title of the Web page, headers on the Web page, and the body of the Web page. Information concerning both of these contextual relationships may be used in conjunction with traditional ranking features to dynamically determine a ranking order of the Web page on a search engine results page.

Still further, the ranking component 228 is configured to utilize the contextual relationships between the different breadcrumb elements or the breadcrumb elements and page elements to present factual information in association with the Web page on the search engine results page. For instance, the contextual relationship between different breadcrumb elements associated with a Web page may provide information on the different Windows operating systems associated with Microsoft®. This information may be presented as factual items in conjunction with the Microsoft search result on the search engine results page.

The rendering component 230 is configured to present the related search items, query suggestions, deep links, and search results on a search engine page. The related search items may be presented simultaneously with a set of algorithmic search results on a search engine results page. Further, the related search items may be presented in separate area as compared to the set of algorithmic search results. The query suggestions may be presented as a user inputs a search query into a search box. The deep links may be presented in association with search results. For example, if a search result has a set of deep links, the deep links will be presented in the same area as the search result. Exemplary user interfaces that further illustrate these aspects are provided in FIGS. 6-8, which will be discussed below.

Figure 5:
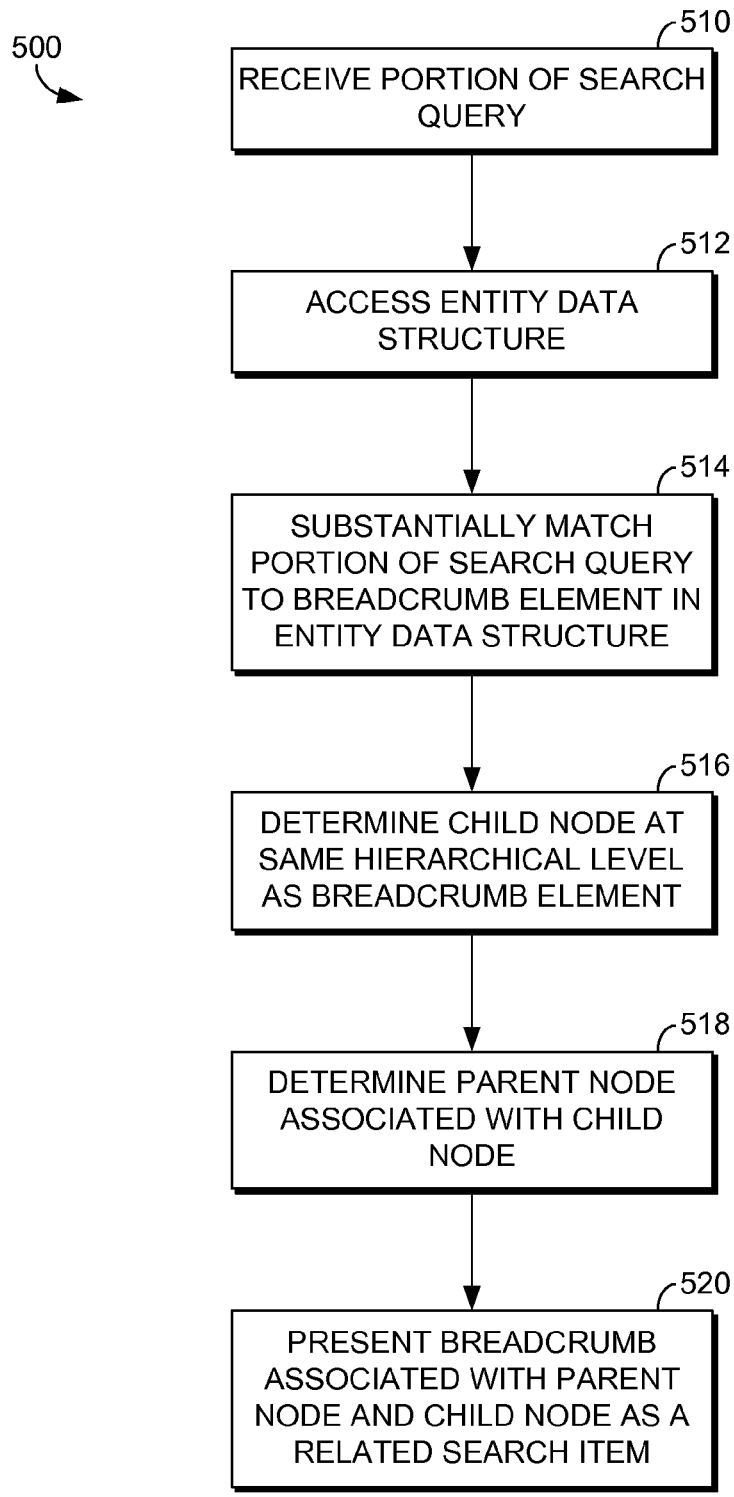
FIG. 5 is an exemplary flow diagram of a method of improving a user's search experience on a search engine results page using an entity data structure generated using breadcrumb elements from a plurality of Web pages in accordance with an embodiment of the present invention.

Turning now to FIG. 5, a flow diagram is depicted illustrating an exemplary method 500 of improving a user's search experience on a search engine page using an entity data structure generated using breadcrumb elements from a plurality of Web pages. In one aspect, the plurality of Web pages is associated with a single domain. At a step 510, at least a portion of a search query is received from a user. The search query may comprise a complete search query, or a term of a search query. At a step 512, the entity data structure is accessed. The entity data structure may be stored in association with a data store such as the data store 212 of FIG. 2 and may be in the form of a graph data structure having one or more root nodes, one or more parent nodes, and one or more child nodes. Each node is associated with a breadcrumb element; in turn, each breadcrumb element comprises an entity and/or concept.

At a step 514, the portion of the search query is substantially matched to a breadcrumb element associated with a first child node of the entity data structure. A query is substantially matched if the child node contains at least one term of the search query. At a step 516, a second child node at the same structural level as the first child node is determined. As mentioned above, nodes are at the same structural level if they share the same root node and have an equal number of intervening nodes between the nodes in question and the root node.

Further, at a step 518, a second parent node associated with the second child node is determined. In one aspect, the second parent node is also the parent node of the first child node. In another aspect, the second parent node is different from the parent node of the first child node. At a step 520, breadcrumb elements associated with the second child node and the second parent node are combined and presented as one or more related search items on a search engine results page. In one aspect, the related search item may contain terms that are different from terms in the search query. The related search item(s) is selectable; selection of a related search item navigates the user to a search engine page containing search results corresponding to the selected related search item.

Using FIG. 4 as an example, a user may input a search query "Honda Accord." The search query may be substantially matched to the child node Accord 420. One or more child nodes at the same structural level as the Accord node 420 are determined; these child nodes may include the Camry node 424 and the Corolla node 426. The Camry node 424 and the Corolla node 426 share the same root node as the Accord node 420 (Auto node 410) but share a different parent node (the Toyota node 416 as compared to the Honda node 414). Breadcrumb elements from the Camry node 424 and the Toyota node 416 are combined to create a first related search item, and breadcrumb elements from the Corolla node 426 and the Toyota node 416 are combined to create a second related search item. Thus, the first related search item comprises "Toyota Camry," and the second related search item comprises "Toyota Corolla." These related search items are subsequently presented on a search engine results page. Alternatively, the search query may be substantially matched to the child node Honda 414. The process set forth above is equally applicable, but the resulting related search item would comprise "Auto Toyota."

Figure 6:
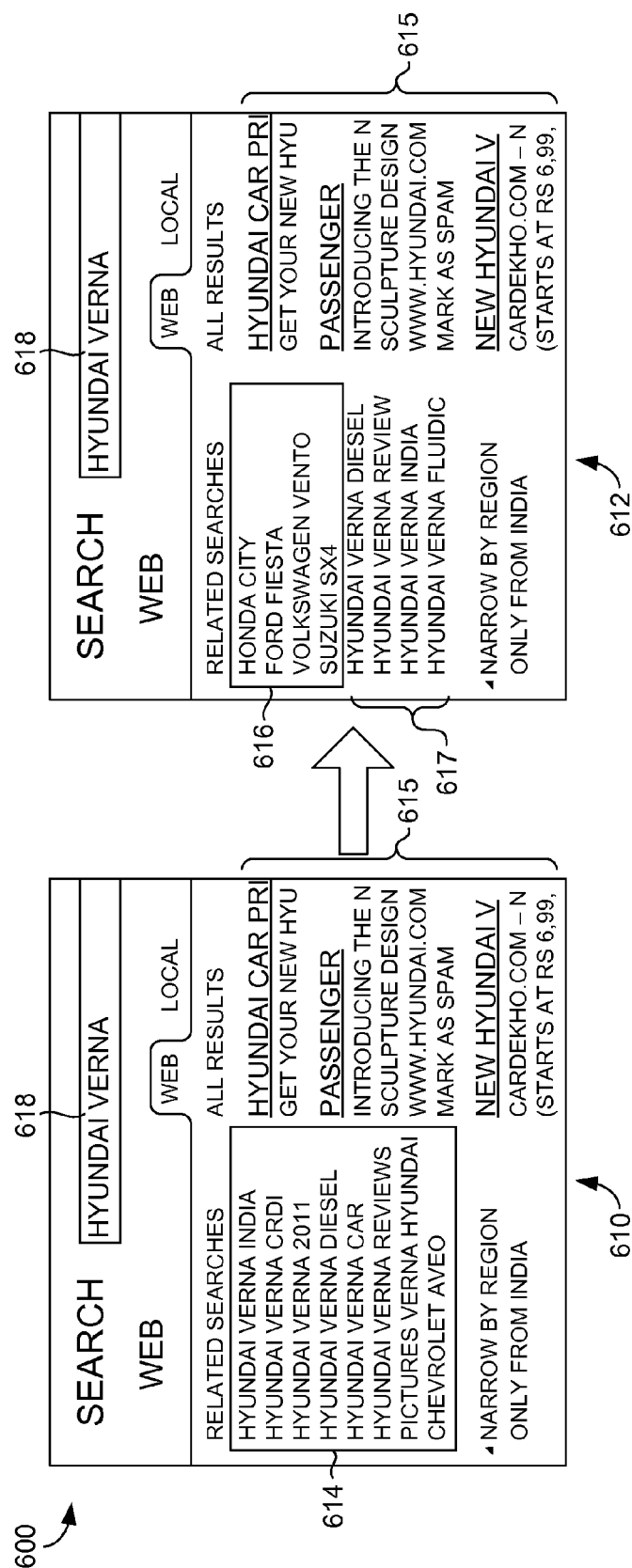
FIG. 6 depicts an exemplary user interface illustrating related search items generated using an entity data structure in accordance with an embodiment of the present invention.

FIG. 6 depicts two exemplary user interfaces (UIs) 610 and 612. The first UI 610 illustrates the presentation of related search items generated without using an entity data structure, while the exemplary UI 612 illustrates the presentation of related search items generated using an entity data structure. As can be seen, UI 610 depicts a search box with a search query 618, "Hyundai Verna." The UI 610 also includes a set of algorithmic search results 615 that correspond to the search query 618. Additionally, the UI 610 includes a "related search" area 614 that includes a number of related searches generated using methods known in the art. The related searches in the related search area 614 closely match user intent as evidenced by the textual similarities shared between the search query 618 and the related searches. For example, a majority of the related search items contain terms that match terms in the search query 618.

By contrast, the UI 612 includes related search items 616 generated using the entity data structure using the method outlined in FIG. 5. As can be seen, the related search items 616 are generally of the same scope as the search query 618, but encompass additional information that may be of interest to the user, thus expanding user intent as evidenced by the search query 618. Additionally, the related search items 616 may contain terms that are textually unrelated to terms in the search query 618. The related search items 616 are presented simultaneously with algorithmic search results 615, but may be presented in a separate area of the search engine results page. As well, the related search items 616 may be presented in conjunction with related search items 617 generated using algorithms known in the art.

Figure 7:
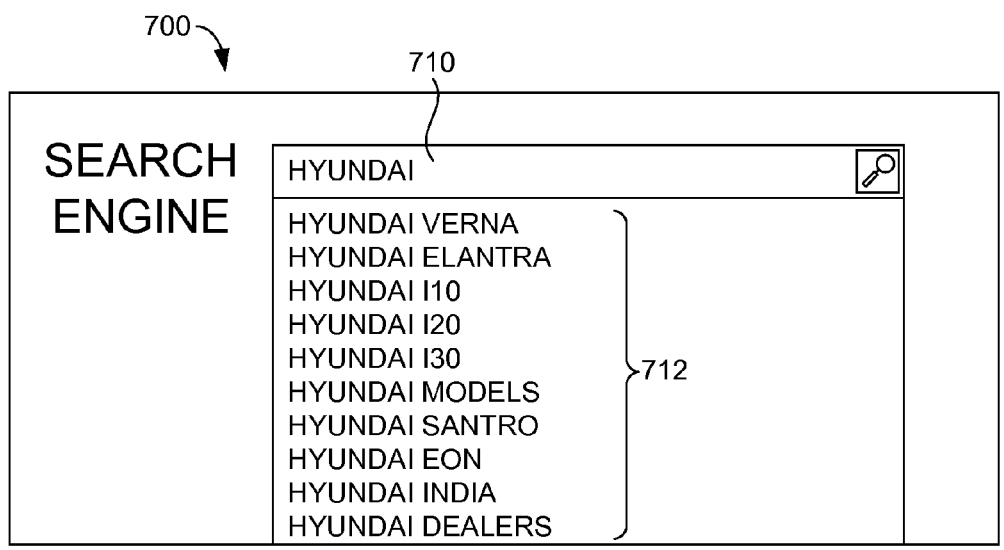
FIG. 7 depicts an exemplary user interface illustrating suggested search queries generated using an entity data structure in accordance with an embodiment of the present invention.

Turning now to FIG. 7, FIG. 7 depicts an exemplary user interface (UI) 700 illustrating the presentation of suggested search queries generated using an entity data structure. The UI 700 includes a search query 710 inputted in a search query box, and a set of suggested search queries 712. The suggested search queries 712 are determined by, for example, a search experience component such as the search experience component 226 of FIG. 2. The suggested queries 712 are generated by matching the search query 710 to a breadcrumb element corresponding to a parent node in the entity data structure. In this case, the search query 710 was matched to one or more parent nodes associated with the breadcrumb element "Hyundai." Breadcrumb elements associated with child nodes of the one or more parent nodes are determined, and this information is combined with the parent node information to create the suggested queries 712. The suggested queries 712 may be different from suggested queries generated using traditional methods known in the art and may answer different facets of user intent as compared to traditional suggested queries.

Figure 8:
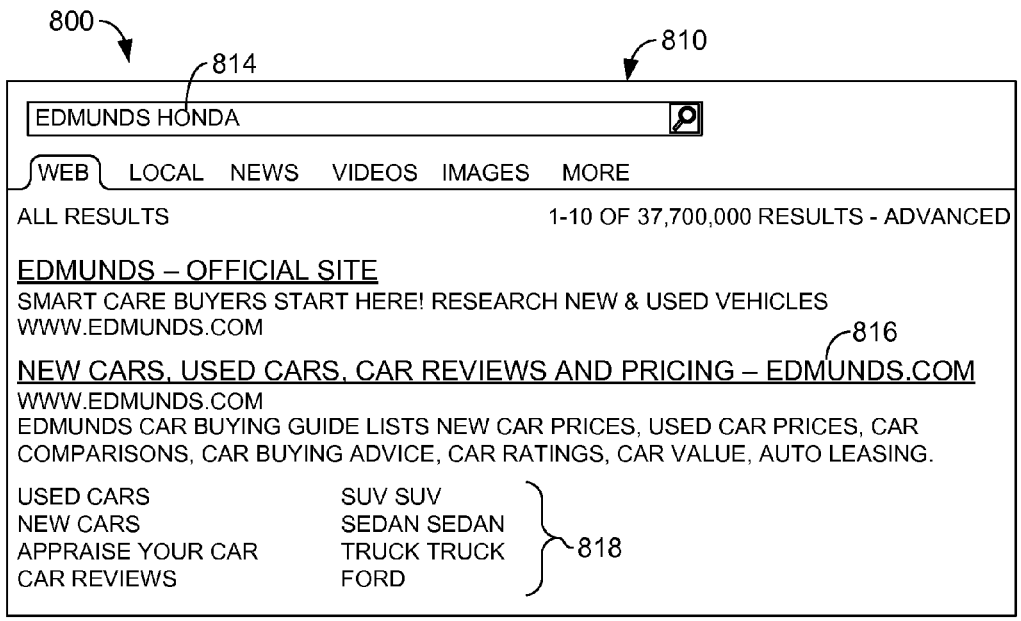
FIG. 8 depicts an exemplary user interface illustrating deep links generated using an entity data structure in accordance with an embodiment of the present invention.
Figure 8:
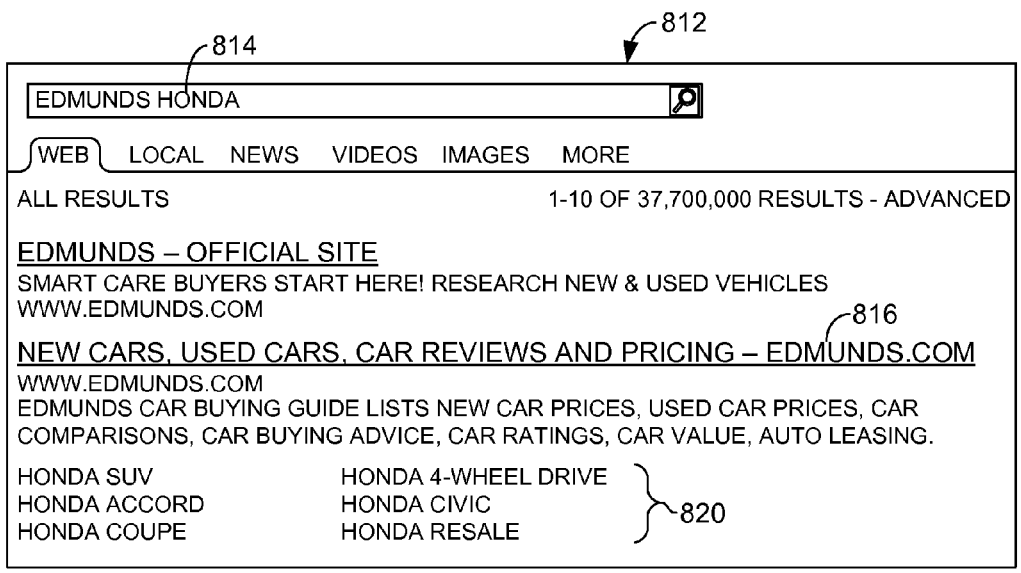

FIG. 8 depicts two exemplary user interfaces (UIs) 810 and 812. The first UI 810 illustrates the presentation of deep links 818 associated with a search result 816. In general, deep links are provided to enable users to navigate to a finer intent within a single domain. The deep links 818 are generated without using an entity data structure. Instead, the deep links 818 are generated using known algorithms. One such algorithm includes presenting as deep links Web pages that are frequently visited by users. Though the deep links 818 may represent Web pages frequently visited by users, the deep links 818 may bear little or no relationship to search query 814, "Edmunds Honda."

By contrast, the UI 812 illustrates the presentation of deep links 820 generated by using an entity data structure associated with the Edmunds domain. As can be seen, the use of the entity data structure enables the generation of deep links that are closely tied to user intent as evidenced by the search query 814. Upon selection of one of the deep links 818, the user is directed to a Web page in the Edmunds domain that presents content directly related to the search query 814 but at a more detailed level as compared to the search result 816.

Figure 9:
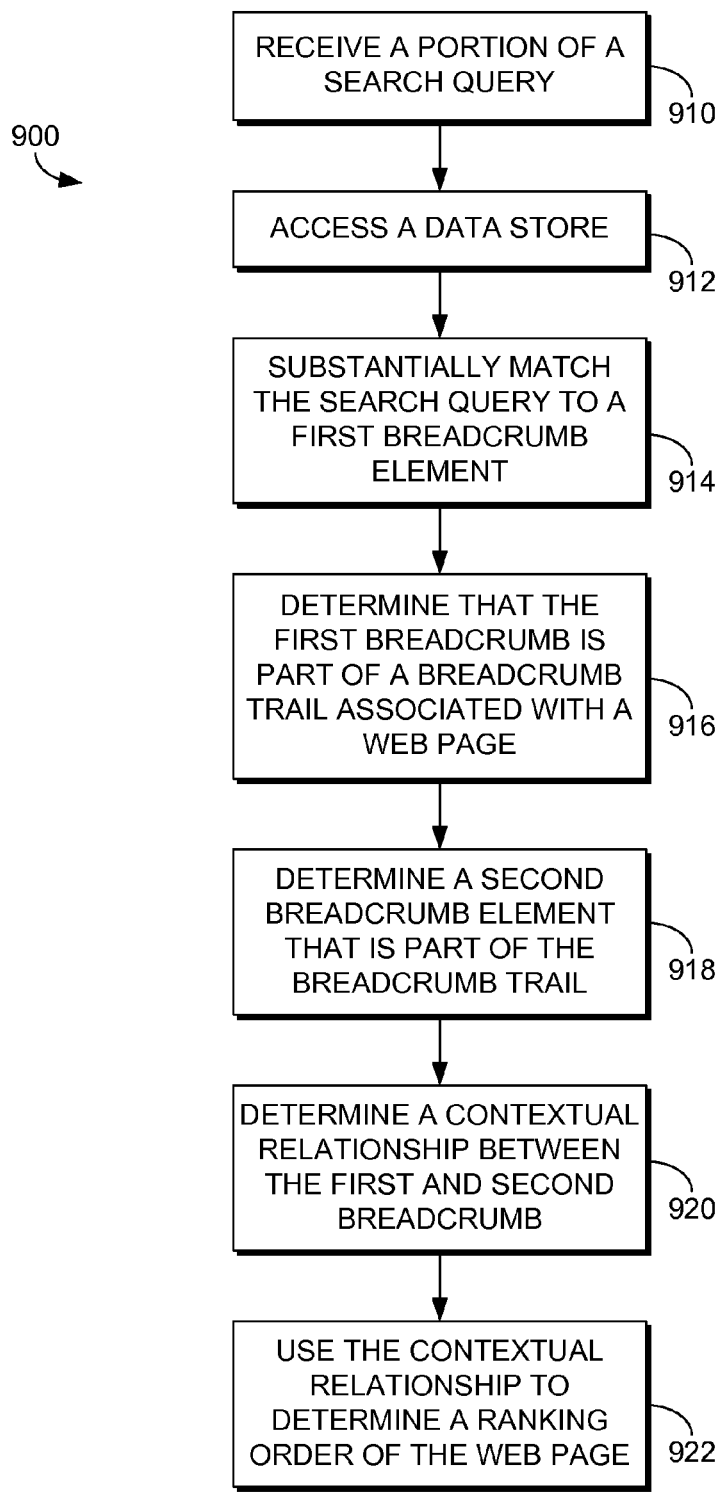
FIG. 9 is an exemplary flow diagram of a method for ranking a Web page on a search engine results page using breadcrumb information associated with the Web page in accordance with a embodiment of the present invention.

Turning now to FIG. 9, an exemplary flow diagram is depicted of a method 900 of ranking a Web page on a search engine results page using breadcrumb information associated with the Web page. At a step 910, a portion of a search query is received by a search engine such as the search engine 210 of FIG. 2. The portion of the search query may comprise a complete search query, or a complete term of a search query. At a step 912, a data store is accessed such as the data store 212 of FIG. 2. The data store stores information about breadcrumb elements and their associated Web pages. This information may include an identity of a Web page and information about a breadcrumb trail associated with the Web page. The information about the breadcrumb trail includes the identity of different breadcrumb elements that make up the breadcrumb trail, a structural position of each breadcrumb element in the breadcrumb trail, and the like.

At a step 914, the portion of the search query is substantially matched to a first breadcrumb element. At a step 916, it is determined that the first breadcrumb element is part of a breadcrumb trail associated with the Web page, and, at a step 918, at least a second breadcrumb element is determined to be part of the breadcrumb trail.

At a step 920, a contextual relationship between the first breadcrumb element and the second breadcrumb element(s) is determined. The contextual relationship may include such things as the relative order of the first breadcrumb element as compared to the second breadcrumb element(s), the meaning of the first breadcrumb element as compared to the meaning of the second breadcrumb element(s), the context of the Web page (and its associated domain) on which the first and second breadcrumb elements are presented, how closely the inputted search query matches the second breadcrumb element, and the like. By way of illustrative example, the breadcrumb element "windows" may have a different meaning depending upon the context in which it is presented. With respect to the breadcrumb trail "home>windows>casement windows," the element "windows" has the meaning of a glass-covered opening in a building. But with respect to the breadcrumb trail "home>categories>computers and electronics>operating systems>windows," the element "windows" refers to an operating system.

Contextual relationships between the first breadcrumb element and page elements associated with the Web page may also be determined. The page elements may include the title of the Web page, headers associated with the Web page, and content within the body of the Web page. Using the example given above, "home>categories>computers and electronics>operating systems>windows," if this breadcrumb trail appeared on a Web page with the title of "Technicalsupport.com," the element "windows" would likely be in the context of technical support for Windows operating systems. However, if the breadcrumb trail appeared on a Web page with the title of "Microsoftproducts.com," the element "windows" would likely be in the context of an ordering page for different types of operating systems.

At a step 922, the contextual relationship between the first and second breadcrumb elements is used to dynamically determine a ranking order of the Web page on the search engine results page. In one aspect, the contextual relationship between the first and second breadcrumb elements is used in conjunction with the contextual relationship between the first breadcrumb element and page elements of the Web page to determine a ranking order of the Web page. These relationships may also be combined with traditional ranking algorithms to determine a ranking order of the Web page. The Web page is subsequently presented on the search engine results page based on the determined ranking order.

Additionally, the contextual relationship between the first and second breadcrumb elements, or the contextual relationship between the first breadcrumb element and page elements of the Web page, may be utilized to present factual information in association with the search result on the search engine results page. For example, if the Web page is directed to Honda cars, the contextual relationship between different breadcrumb elements associated with the Web page may provide information on the different models of Honda cars (Accord, Civic, etc.). This factual information may be presented in association with the search result on the search engine results page.

Figure 10:
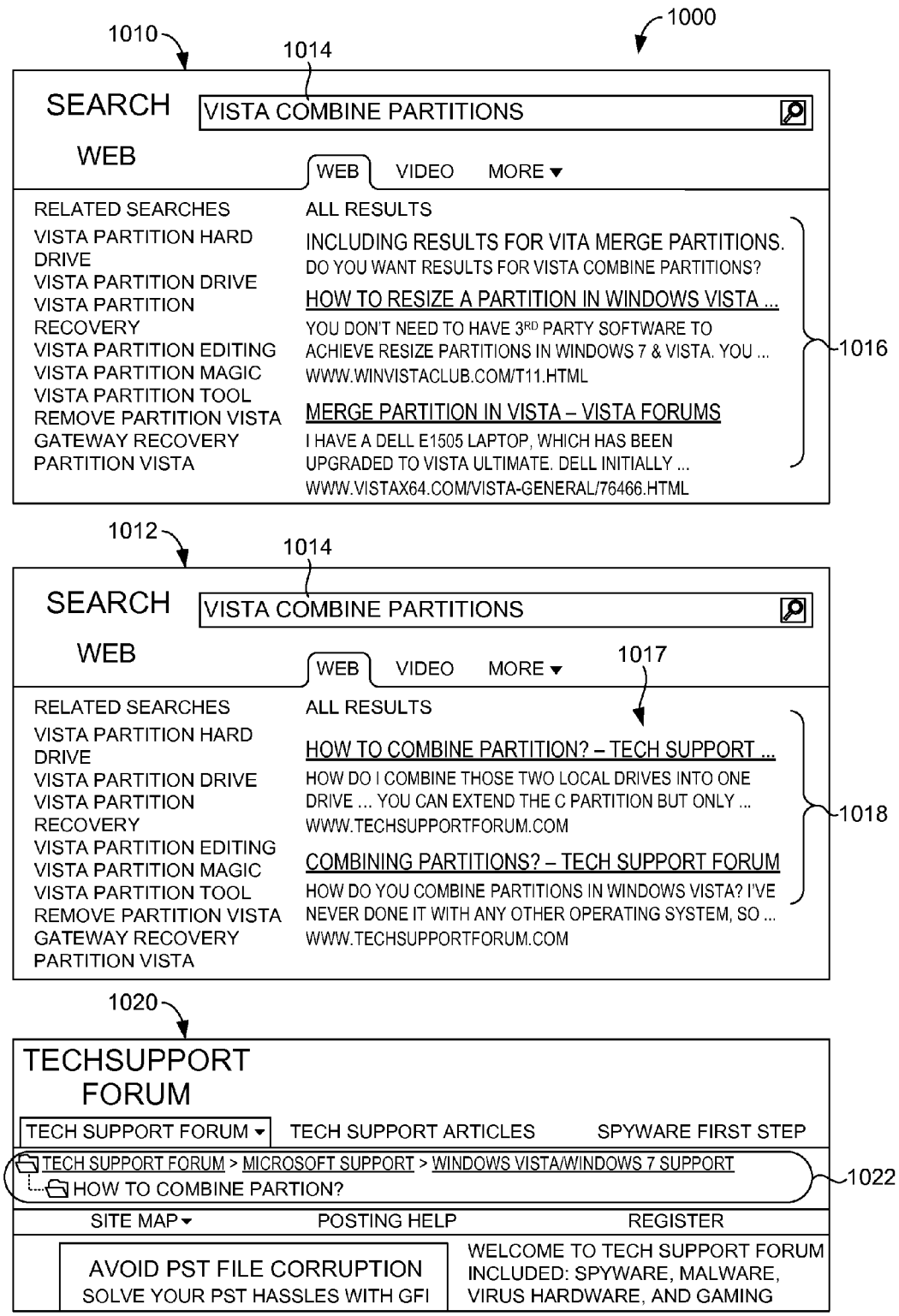
FIG. 10 depicts an exemplary user interface illustrating utilizing breadcrumb information to improve a ranking of a Web page in accordance with an embodiment of the present invention.

FIG. 10 depicts exemplary user interfaces (UIs) 1010 and 1012. UI 1010 depicts search results 1016 returned in response to a search query 1014. The search results 1016 are ranked according to traditional ranking algorithms. One example of such an algorithm consists of matching terms in the search query to terms in the title, heading, and/or body of a Web page—the higher the number of matches, the higher the ranking order of the Web page. Although these algorithms may take into account the context of terms within a single element (title, or heading, or body), the algorithms fail to take into account the relationships of the terms in the different elements (title, heading, or body) in the context of each other.

UI 1012 depicts search results 1018 returned in response to the search query 1014. The search results 1018 are ranked, in part, according to breadcrumb information associated with the search results 1018. For example, a first search result 1017 is drawn from a Web page having breadcrumb information 1022 as depicted in UI 1020. The breadcrumb information 1022 includes a breadcrumb element, "How to combine partitions," that substantially matches terms in the search query 1014. The breadcrumb element "How to combine partitions," is analyzed in the larger context of the entire breadcrumb trail 1022. The breadcrumb trail 1022 provides information such as the type of Web page (a technical support forum), and what operating systems are being addressed (Windows Vista and Windows 7). The contextual relationships between these different breadcrumb elements are used to improve the ranking of the Web page 1017 as compared to traditional ranking algorithms that simply match terms. Additionally, the breadcrumb element "How to combine partitions," may also be analyzed in the still larger context of the content of the title, heading, and/or body of the Web page on which the breadcrumb element appears. As mentioned above, the contextual relationships between the different breadcrumb elements in the breadcrumb trail 1022 may be used in conjunction with other ranking algorithms to determine a final ranking order of the Web page 1017.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A system for generating an entity data structure using breadcrumb information, the system comprising:
 a computing device associated with a search engine having one or more processors and one or more computer-readable storage media; and
 a data store coupled with the search engine,
 wherein the search engine:
  extracts a plurality of Web pages associated with a first Web domain;
  identifies hypertext markup language (HTML) source code for each Web page of the plurality of Web pages;
  using the HTML source code for the each Web page, determines breadcrumb information associated with the each Web page, the breadcrumb information comprising relationships between different breadcrumb elements of a breadcrumb trail associated with the each Web page;
  aggregates the breadcrumb information for the plurality of Web pages belonging to the first domain;
  using the aggregated breadcrumb information, generates a first entity data structure, the first entity data structure comprising structural relationships between different breadcrumb elements associated with the plurality of Web pages associated with the first Web domain; and
  augments the first entity data structure with information from at least a second entity data structure associated with at least a second Web domain different from the first Web domain, the information comprising structural relationships between different breadcrumb elements associated with a plurality of Web pages associated with the second Web domain.

2. The system of claim 1, wherein the first and second entity data structures each comprise a graph data structure, the graph data structure comprising a root node, one or more parent nodes, and one or more children nodes, and wherein each node is associated with a breadcrumb element.

3. The system of claim 1, wherein using the HTML source code for the each Web page to determine breadcrumb information associated with the each Web page comprises:
 identifying HTML tag patterns and content within the HTML tag patterns;
 identifying one or more hierarchy separators; and
 determining a structural position on the Web page of the content and the one or more hierarchy separators.

4. The system of claim 3, wherein the one or more hierarchy separators comprise one or more of the following separators: >, >>, or :.

5. The system of claim 1, wherein the breadcrumb trail comprises a navigational tool published by an owner of the first Web domain.

6. The system of claim 1, wherein the breadcrumb trail comprises a plurality of breadcrumb elements arranged in a structural relationship.

7. The system of claim 1, wherein the first and second entity data structures are generated in an offline setting.

8. The system of claim 1, further comprising:
 wherein the search engine:

aggregates the first entity data structure with one or more additional entity data structures across multiple domains to generate a master entity data structure.

9. One or more computer-storage memory devices having embodied thereon computer-executable instructions that, when executed, perform a method of improving a user's search experience on a search engine page using an entity data structure generated using breadcrumb elements from a plurality of Web pages, the method comprising:
   receiving at least a portion of a search query inputted by a user;
   accessing a data store that stores the entity data structure generated using the breadcrumb elements from the plurality of Web pages, wherein each breadcrumb element is part of a breadcrumb trail that represents a traversal path associated with each of the plurality of Web pages, the entity data structure in the form of a graph data structure having one or more root nodes, one or more parent nodes, and one or more child nodes;
   using the entity data structure, matching the at least the portion of the search query to a term in a breadcrumb element associated with a first child node in the entity data structure, the first child node having a first parent node;
   determining at least a second child node at the same structural level as the first child node, the second child node sharing a same root node as the first child node;
   identifying a second parent node associated with the at least the second child node, the second parent node being different from the first parent node; and
   presenting breadcrumb elements associated with the second parent node and the at least the second child node as at least one search item related to the at least the portion of the first search query on the search engine page, the at least one search item presented simultaneously with a set of algorithmic search results corresponding to the at least the portion of the search query, wherein the at least one search item is presented in a separate area than the set of algorithmic search results.

10. The computer-storage memory devices of claim 9, wherein the plurality of Web pages is associated with a single Web domain.

11. The computer-storage memory devices of claim 9, wherein the at least a portion of the search query comprises a complete term.

12. The computer-storage memory devices of claim 11, wherein the at least one search item comprises at least one term, and wherein the one term is different from the complete term in the at least a portion of the search query.

13. The computer-storage memory devices of claim 12, wherein the at least one search item is selectable, and wherein upon user selection of the at least one search item, the user is presented with a set of algorithmic search results corresponding to the at least one search item.

14. The computer-storage memory devices of claim 9, further comprising:
   using the entity data structure, matching the at least a portion of the search query to a term of a breadcrumb element associated with a parent node of the one or more parent nodes;
   determining one or more child nodes associated with the parent node;
   presenting breadcrumb elements associated with the parent node and the one or more child nodes as a query suggestion on the search engine page.

15. The computer-storage memory devices of claim 14, further comprising:
   determining at least a first Web page of the plurality of Web pages corresponding to the at least a portion of the search query;
   presenting the at least the first Web page as a search result on the search engine page; and
   simultaneously presenting the breadcrumb elements associated with the parent node and the one or more child nodes as at least one deep link associated with the search result.

16. The computer-storage memory devices of claim 15, wherein the at least one deep link is selectable, and wherein user selection of the at least one deep link navigates the user to at least a second Web page containing the breadcrumb elements associated with the parent node and the one or more child nodes, the at least the second Web page having more refined content than content associated with the at least the first Web page.

17. The computer-storage memory devices of claim 15, wherein the at least one deep link is presented in the same area as the search result on the search engine page.

18. A computerized method carried out by a search engine running on one or more processors for ranking a Web page on a search engine results page using breadcrumb information associated with the Web page, the method comprising:
   receiving at least a portion of a search query inputted by a user;
   accessing a data store, the data store comprising a plurality of breadcrumb elements associated with a plurality of Web pages;
   matching the at least a portion of the search query to a term associated with a first breadcrumb element;
   determining that the first breadcrumb element is part of a breadcrumb trail associated with the Web page of the plurality of Web pages, the breadcrumb trail comprising a plurality of breadcrumb elements in a structural arrangement;
   determining a first contextual relationship between the first breadcrumb element and the remaining plurality of breadcrumb elements, the first contextual relationship comprising a relative position of the first breadcrumb element compared to the remaining plurality of breadcrumb elements and a textual meaning of the first breadcrumb element and the remaining plurality of breadcrumb elements;
   determining a second contextual relationship between the first breadcrumb element and other page elements of the Web page, the other page elements of the Web page comprising at least one of a title, a heading, or a body of the Web page; and
   using the first and second contextual relationships to dynamically determine a ranking order of the Web page on the search engine results page.

* * * * *